(12) United States Patent
Palmese et al.

(10) Patent No.: US 9,884,944 B2
(45) Date of Patent: Feb. 6, 2018

(54) REMENDABLE INTERFACES FOR POLYMER COMPOSITES

(75) Inventors: Giuseppe R. Palmese, Hainesport, NJ (US); Amy M. Peterson, Philadelphia, PA (US); Robert E. Jensen, Newark, DE (US)

(73) Assignees: Drexel University, Philadelphia, PA (US); The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/698,399

(22) PCT Filed: May 18, 2011

(86) PCT No.: PCT/US2011/036939
§ 371 (c)(1),
(2), (4) Date: Nov. 16, 2012

(87) PCT Pub. No.: WO2011/146577
PCT Pub. Date: Nov. 24, 2011

(65) Prior Publication Data
US 2013/0059988 A1    Mar. 7, 2013

Related U.S. Application Data

(60) Provisional application No. 61/346,305, filed on May 19, 2010.

(51) Int. Cl.
*C08J 5/04* (2006.01)
*C08K 9/04* (2006.01)
(Continued)

(52) U.S. Cl.
CPC .............. *C08J 5/04* (2013.01); *C08L 71/02* (2013.01); *C08G 2261/126* (2013.01);
(Continued)

(58) Field of Classification Search
CPC ...... C08J 5/06; C08J 5/05; C08J 51/10; C08L 51/10
(Continued)

(56) References Cited

U.S. PATENT DOCUMENTS 3,966,531 A * 6/1976 Bargain ................. 156/329
6,191,286 B1 * 2/2001 Gunther et al. ........... 548/548
2010/0075134 A1    3/2010 Blaiszik et al.

FOREIGN PATENT DOCUMENTS

JP     2003-183348 A  *  7/2003
WO    WO 2010/044661 A1  *  4/2010

OTHER PUBLICATIONS

Peterson et al., "Development of Remendable Materials with Diels-Alder Chemistry," SAMPE Conference Proceedings (2008), 53, pp. 150/1-150/7.*

(Continued)

*Primary Examiner* — Randy Gulakowski
*Assistant Examiner* — Ha S Nguyen
(74) *Attorney, Agent, or Firm* — Mendelsohn Dunleavy, P.C.

(57) ABSTRACT

Functionalized polymer matrix and/or reinforcement materials that are capable of a thermoreversible Diels-Alder reaction are useful for making composite materials. Also disclosed is a composite material which includes one or both of functionalized reinforcement materials and functionalized polymer matrix materials, as well as a method for repairing a composite material including the step of thermally treating the composite material at a temperature sufficient to react a functionality on one of the reinforcement material and the polymer matrix material with another functionality via a Diels-Alder reaction. A method of making a composite material including functionalizing one or both of a reinforcing material and a polymer matrix material with a first reactive group, providing a second reactive group capable of undergoing a Diels-Alder reaction with the first reactive (Continued)

group and reacting the first and second reactive groups to form a composite material, is also described.

22 Claims, 8 Drawing Sheets

(51) Int. Cl.
    *C08K 9/10*         (2006.01)
    *C08L 63/00*      (2006.01)
    *C08L 71/02*      (2006.01)
    *C08L 77/00*      (2006.01)
    *C08L 79/08*      (2006.01)

(52) U.S. Cl.
    CPC ............ *C08G 2261/46* (2013.01); *C08K 9/04* (2013.01); *C08K 9/10* (2013.01); *C08L 63/00* (2013.01); *C08L 79/085* (2013.01)

(58) Field of Classification Search
    USPC ........ 526/262, 266, 270; 523/200, 202, 203; 525/533, 526, 422
    See application file for complete search history.

(56) References Cited

OTHER PUBLICATIONS

Chongjun et al., "An Overview on Self-Healing Smart Composites," Yuhang Cailiao Gongyi (2006), 36(1), pp. 5-15.*

STN CASPLUS Abstract of U.S. Pat. No. 3966531A, "Silanes with imide-group containing compositions," pp. 1-2, 1976.*

LaRonde et al., "Controlling silica surfaces using responsive coupling agents," Colloid Polymer Science, (2003), vol. 281, pp. 391-400.*

Blaiszik, B. J., et al., "Nanocapsules for Self-Healing Materials." Composites Science and Technology; 2008, vol. 68, No. (3-4), pp. 978-986.

Caruso, M. M., et al., "Solvent-Promoted Self-Healing Epoxy Materials," Macromolecules, 2007, vol. 40, No. 25, pp. 8830-8832.

Cho, S. H., et al., "Polydimethylsiloxane-Based Self-Healing Materials." Advanced Materials, 2006, vol. 18, No. 8, pp. 997-1000.

Pang, J. W. C., et al., "A Hollow Fibre Reinforced Polymer Composite Encompassing Self-Healing and Enhanced Damaged Visibility." Composites Science and Technology, 2005, vol. 65, Nos. 11-12, pp. 1791-1799.

Peterson, A. M., et al., "Room-Temperature Healing of a Thermosetting Polymer Using the Diels-Alder Reaction." Applied Materials and Interfaces, 200, vol. 2, No. 4, pp. 1141-1149.

White, S. R., et al., "Autonomic Healing of Polymer Composites." Nature, 2001, vol. 409, No. 6822, pp. 794-797.

Yuan, L., et al., Thermal Stability of Microencapsulated Epoxy Resins with Poly(Urea-Formaldehyde). Polymer Degradation and Stability, 2006, vol. 91, No. 10, pp. 2300-2306.

* cited by examiner

REMENDABLE INTERFACES FOR POLYMER COMPOSITES

STATEMENT OF GOVERNMENT INTEREST

This invention was made with support from the National Science Foundation, Contract No. DGE-0654313, and United States Army Research Laboratory, Grant/Award No. W911NF-06-2-0013, and one inventor is an employee of the United States Army Research Laboratory, which is an agency of the United States Government. Thus, the United States Government has certain rights in this invention.

BACKGROUND OF THE INVENTION

1. Field of the Invention

The invention relates to a new composite system in which the interface/interphase between the reinforcing material and the matrix is remendable. Following an interfacial failure heating the composite breaks and reforms Diels-Alder bonds across the interface in order to restore the properties of the composite system.

2. Brief Description of the Prior Art

Materials that can recover mechanical properties are highly desirable. Because remendable materials both repair and prevent the propagation of cracks on the micro scale, they offer the potential for increased durability, safety, and cost efficiency for many applications. Two approaches for mending or healing polymer networks have captured much attention. In one method, polymer networks are made to self-heal by incorporating microcapsules filled with uncured resin as a secondary phase. Upon fracture, the microcapsules rupture and release resin, which polymerizes to heal the fracture. Often, a catalyst is also included in the polymer network to initiate polymerization of the uncured resin when released. The other method relies on incorporation of reversible bonds into the polymer network. The reversible nature of these linkages allows for network remodeling at the damage site.

Polymers used in load-bearing applications are often reinforced with rigid particles or fibers to improve their specific strength. Adhesion between the reinforcement and the polymer matrix is essential for load transfer from the polymer matrix to the reinforcement material. However, the difference in properties between the matrix material and the reinforcement material makes the interface between the two a location for stress concentration and eventual crack or fracture formation. Fatigue, whether mechanically or thermally induced, leads to growth of such cracks and is the major cause of mechanical failure in composites. Surface treatments and application of a chemical sizing are conventional options for improving interfacial adhesion and durability of composites.

Despite this, fatigue will eventually result in interfacial failure even with the most durable surface treatment. However, if an interface can form reversible covalent bonds between the polymer network and the reinforcement material, this interface will be capable of healing, resulting in an improvement in the mechanical properties and an extension of the lifetime of the composite. Another approach for healing of interfacial failure via the introduction of healing agent-filled capsules is described in U.S. Patent application publication no. US 2010/0075134 A1.

The Diels-Alder reaction is a cycloaddition of a diene and a dienophile. In the case of furan and maleimide, furan acts as the diene and maleimide acts as the dienophile. The reaction favors the product (Diels-Alder adduct) below 60° C. and the reactants (furan and maleimide) above 90° C. Between 60 and 90° C. equilibria exist between various relative concentrations of the products and reactants. FIG. 1 shows this reversible reaction. A representation of the concept of this invention is shown in FIG. 2.

Thus, there is a need for composite materials which can repair themselves. These and other objects of the present invention will be apparent from the summary and detailed description which follow.

SUMMARY OF THE INVENTION

In a first embodiment, the present invention provides a functionalized polymer matrix for a composite material including a first reactive group that is capable of a thermoreversible Diels-Alder reaction with a second reactive group that may be provided to the composite material to produce remendable composite materials.

In a second embodiment, the present invention provides a functionalized reinforcing material including for use in a composite, which includes a first reactive group that is capable of a thermoreversible Diels-Alder reaction with a second reactive group that may be provided to the composite material to produce remendable composite materials.

In a third embodiment, the present invention relates to a remendable composite material made from either a functionalized polymer matrix or a functionalized reinforcing material including a first reactive group having the capability of undergoing a thermoreversible Diels-Alder reaction with a second reactive group provided to the composite material to make the composite material remendable.

In a fourth embodiment, the present invention relates to a method for repairing a composite material including the step of thermally treating the composite material at a temperature sufficient to react a first reactive group of either the polymer matrix or the reinforcing material with a second reactive group provided to the composite material, wherein the reaction is a thermoreversible Diels-Alder reaction.

In yet another aspect, the invention provides a method of making a remendable composite material including functionalizing either a polymer matrix material or a reinforcing material with a first reactive group, and reacting the first reactive group with a second reactive group via a Diels-Alder reaction to form a remendable composite material.

DETAILED DESCRIPTION OF PREFERRED EMBODIMENTS

Figure 1:
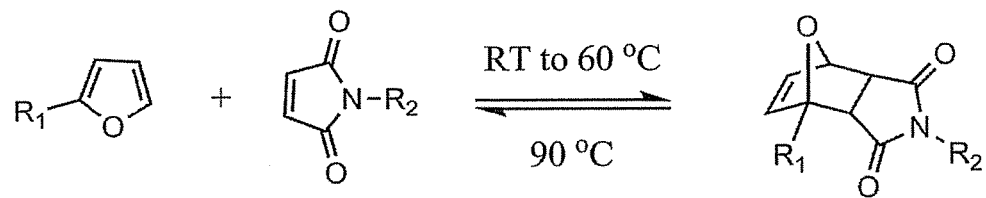
FIG. 1 shows the thermoreversible reaction of furan and maleimide.
Figure 2:
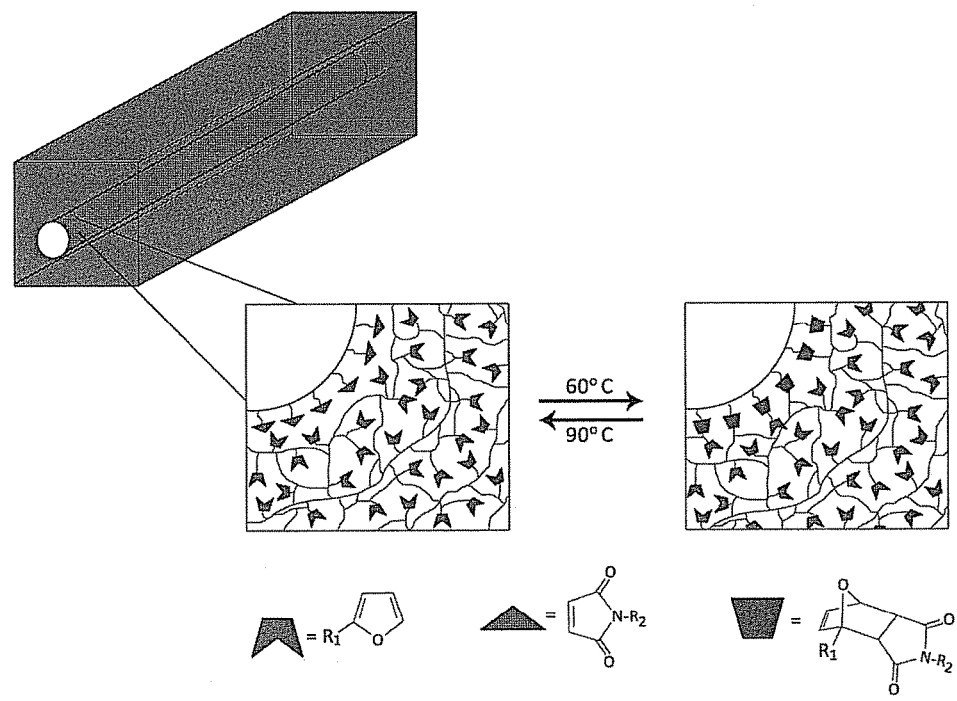
FIG. 2 shows a schematic representation of the interfacial healing concept of the present invention wherein a maleimide functionality of a glass fiber reacts within a furan-functionalized polymer network to provide a thermoreversible, healable fiber-network interface.

The following definitions are included to provide a clear and consistent understanding of the specification and claims.

The term "polymer" means a substance containing more than 100 repeat units. The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix" means a continuous phase in a material.

The term "reinforcing material" means a material that, when added to a solid polymer matrix, increases the strength of the matrix relative to the pure polymer. Examples of reinforcing materials include solid particles and fibers.

The term "matrix precursor" means a composition that will form a polymer matrix when it is solidified. A matrix precursor may include a monomer and/or prepolymer that can polymerize to form a solid polymer matrix. A matrix precursor may include a polymer that is dissolved or dispersed in a solvent, and that can form a solid polymer matrix when the solvent is removed. A matrix precursor may include a polymer at a temperature above its melt temperature, and that can form a solid polymer matrix when cooled to a temperature below its melt temperature.

The present invention uses a reversible reaction to provide the ability to heal or repair a composite system by forming interfacial bonds between the reinforcing material and the polymer matrix. The system of the present invention provides a simple and effective method for creating a reinforced composite with remendable interfaces. The temperatures for healing are low enough that healing or remending can be performed on site.

Suitable reversible reactions within the scope of the present invention include, for example, thermoreversible Diels-Alder reactions. Exemplary thermoreversible Diels-Alder reactions include the reactions between a furan and a maleimide (60-100° C.), between a fulvene and a maleimide (30-100° C.), between two or more cyclopentadienes (80-180° C.) and between an isocyanate and a secondary amine (>100° C.). Thus, the first and second reactive groups referenced below may form any pair of these reactive groups, e.g. furan and maleimide, fulvene and maleimide, two cyclopentadienes, or isocyanate and secondary amine.

Either the polymer matrix material or the reinforcing material of the invention has a first reactive group and a tailorable $T_g$. Another, second reactive group capable of undergoing a thermoreversible Diels-Alder reaction with the first reactive group is provided to the composite material by functionalizing the other of the polymer matrix material or the reinforcing material, by inclusion of the second reactive group in the composite in the form of a capsule or both. Reinforcing material is bound with the functionalized polymer matrix via the thermoreversible Diels-Alder reaction between the first and second reactive groups, demonstrating improved apparent adhesion. Since the bonding at the reinforcing material-polymer interface is reversible, delamination of the reinforcing material can be healed and mechanical properties can be recovered.

In one embodiment, the reinforcing material is functionalized with the first reactive group and the second reactive group is provided by functionalizing the polymer matrix material, by including the second reactive group in the composite material in a capsule or both. In an alternative embodiment, the polymer matrix material is functionalized with the first reactive group and the second reactive group is provided by functionalizing the reinforcing material, by including the second reactive group in the composite material in a capsule or both.

The present invention can be used to make foams, rubbery materials and brittle materials depending on the type of polymer matrix that is employed.

One embodiment of the invention employs the Diels-Alder reaction between a maleimide and a furan moiety to form the interfacial bonds. This can be accomplished by, for example, grafting of a maleimide containing species onto the surface of the reinforcing phase (i.e. glass fiber) and the modification of the polymer matrix material to include furan functionality. The sizing procedure for the reinforcement material can easily be scaled up to production levels. Methods for maleimide functionalization of the reinforcing material and furan functionalization of the polymer matrix are described in detail below.

This embodiment can also be carried out, for example, by functionalizing the polymer matrix material with the furan functionality and providing the maleimide functionality in capsules included within the composite. Also, a combination of functionalization of the reinforcing material with reactive maleimide groups and inclusion of additional reactive maleimide groups in capsules in the composite material may also be employed.

Alternatively, the maleimide containing species can be grafted onto the surface of the polymer and the furan functionality can be grafted onto the reinforcing phase. The reinforcement material may be functionalized with a furan through reaction of amine-functionalized reinforcing material with furfuryl glycidyl ether, among other possible functionalization routes. See Dirlam et al., *Langmuir*, 2010 26(6) 3942-3948. Maleimide functionalized networks may be produced through including some amount of bismaleimide in an epoxy-amine thermosetting resin containing an excess of amines The excess amines would be able to react with one functional group on the bismaleimide, leaving a free maleimide. Bismaleimide thermosets also contain a certain amount of free maleimides and this amount can be adjusted through control of the degree of cure of the network.

Maleimide-functionalization of the reinforcing material used in combination with a furan-functionalized polymer matrix or furan-functionalization of the reinforcing material used in combination with a maleimide functionalized polymer matrix will result in a healable, reinforcing material-polymer network interface using the thermoreversible reaction between the maleimide and furan functionalities.

The polymer matrix precursor may be any polymer in which the monomer reactive groups include epoxies, amines, vinyl groups, methacrylates, alcohols, carboxyl groups, aldehydes, or isocyanates since polymers made from these precursors can be functionalized to provide the reactive groups required for the Diels-Alder reaction.

There exist a wide range of functionalized monomers which allow for functionalization of many different types of polymers. For example, the various furan-functionalized monomers mentioned above allow for furan-functionalization of many polymers. See Kavitha and Singha, *Macromolecular Chem. & Phys.* 2007 208 2569-2577, Gandini, *Macromolecules* 2008 41(24) 9491-9504, Liu and Chen, *Macromolecular Chem. & Phys.* 2007 208(2) 224-232, Goiti et al., *Euro. Polym. J.* 2004 40(7) 1451-1460 Gheneim et al. *Macromolecules* 2002 35(19) 7246-7253. The synthesis of a maleimide-functionalized polyamide is demonstrated in Liu et al., *Polymer* 2006 47(8) 2581-2586.

The polymer matrix may include a polyamide such as nylon; a polyester such as poly(ethylene terephthalate) and polycaprolactone; a polycarbonate; a polyether; an epoxy polymer; a vinyl ester polymer; a polyimide such as polypyromellitimide (for example KAPTAN); a phenol-formaldehyde polymer such as BAKELITE; an amine-formaldehyde polymer such as a melamine polymer; a polysulfone; a poly(acrylonitrile-butadiene-styrene) (ABS); a polyurethane; a polyolefin such as polyethylene, polystyrene, polyacrylonitrile, a polyvinyl, polyvinyl chloride and poly(DCPD); a polyacrylate such as poly(ethyl acrylate); a poly(alkylacrylate) such as poly(methyl methacrylate); a polysilane such as poly(carborane-siloxane); and a polyphosphazene. A preferred polymer matrix is made from diglycidyl ether of bisphenol-A (DGEBA). Preferably, the polymer network is a furan-functionalized epoxy-amine thermoset.

The polymer matrix may include an elastomer, such as an elastomeric polymer, an elastomeric copolymer, an elastomeric block copolymer, and an elastomeric polymer blend. Self-healing materials that include an elastomer as the solid polymer matrix are disclosed, for example, in U.S. Pat. No. 7,569,625 to Keller et al. The polymer matrix may include a mixture of these polymers, including copolymers that include repeating units of two or more of these polymers, and/or including blends of two or more of these polymers.

The polymer matrix may include other ingredients in addition to the polymeric material. For example, the matrix may contain one or more stabilizers, antioxidants, flame retardants, plasticizers, colorants and dyes, fragrances, or adhesion promoters.

One type of adhesion promoter that may be present includes a substance that promotes adhesion between the polymer matrix and the reinforcing material. The adhesion between the matrix and reinforcing material may influence the strength and/or toughness of the composite. To promote adhesion, various silane coupling agents may be used. Typically, these are compounds of the formula R—SiX$_3$, where R is preferably a reactive group R$^1$ separated by a propylene group from silicon, and X is an alkoxy group (preferably methoxy), such as R$^1$—CH$_2$CH$_2$CH$_2$Si(OCH$_3$)$_3$. Examples include the following silane coupling agents available from DOW CORNING (Midland, Mich.), with the reactive group noted in parentheses: Z6020 (Diamino); Z6030 (Methacrylate); Z6032 (Styrylamine Cationic); Z6040 (Epoxy); and Z6075 (Vinyl). To increase the adhesion between capsules and the solid polymer matrix, the capsules may be treated by washing them in a solution of the coupling agent. For example, urea-formaldehyde capsules may be washed in a solution of silane Z6020 or Z6040 and hexane, followed by adding silane Z6032 to the polymer matrix.

The polymer matrix itself may be a self-healing material. In one example, the solid polymer matrix may include a supplemental plurality of capsules that include a supplemental liquid healing agent. In another example, the solid polymer matrix may include a supplemental plurality of particles that include a supplemental healing agent. In another example, the solid polymer matrix may include both the supplemental plurality of capsules and the supplemental plurality of particles. For example, in the case of the furan/maleimide Diels-Alder reaction, the supplemental capsules or particles may include a liquid solution of a maleimide group containing compound.

Self-healing materials that may be used as the polymer matrix are described, for example, in U.S. Pat. No. 6,518,330 to White et al.; in U.S. Pat. No. 6,858,659 to White et al.; in U.S. Pat. No. 7,566,747 to Moore et al.; in U.S. Patent Application Publication 2006/0111469 with inventors White et al., published May 25, 2006; in U.S. Patent Application Publication 2006/0252852 A1 with inventors Braun et al., published Nov. 9, 2006; in U.S. Patent Application Publication 2007/0166542 A1 with inventors Braun et al., published Jul. 19, 2007; U.S. Pat. No. 7,569,625 to Keller et al.; in U.S. Patent Application Publication 2008/0299391 A1 with inventors White et al., published Dec. 4, 2008; in U.S. Patent Application Publication 2009/0181254 A1 to White et al., published Jul. 16, 2009; in PCT Publication WO 2009/055772 A1, with inventors Caruso et al., published Apr. 30, 2009; in U.S. Patent Application Publication 2009/0191402 A1, with inventors Beiermann et al., published Jul. 30, 2009; and in U.S. Patent Application Publication no. 2010/0075134 A1.

The reinforcing material may be any material that, when added to a solid polymer matrix, increases the strength of the matrix relative to the pure polymer. The reinforcing material may be a solid particle and/or a fiber, and may include an inorganic and/or an organic material. Examples of particulate reinforcing materials include carbon black, ceramic particles, metal particles, and polymer particles. Examples of fibrous reinforcing materials include graphite fibers, ceramic fibers, metal fibers, and polymer fibers. Examples of graphite reinforcing fibers include Thornel 25 and Modmor. Examples of ceramic reinforcing fibers include metal oxide fibers such as titanium oxide fibers, zirconium oxide fibers and aluminum oxide fibers; silica fibers; and glass fibers, such as E-glass fibers and S-glass fibers. Examples of metal fibers include steel fibers, tungsten fibers, or any other fibers or reinforcing materials that can be silanated. Examples of polymer fibers include poly(vinyl alcohol) fibers, polyester fibers, nylon fibers, rayon fibers, and polyaramid fibers, such as Kevlar. Hydrophobic polymer fibers can be silanated following oxygen plasma treatment. Preferably the reinforcing material includes a fiber having an aspect ratio (width: length) of at least 1:5, preferably of at least 1:10, and more preferably of at least 1:100. Reinforcing fibers may be present in a variety of preform types. For example, the fibers may be present as rovings, chopped-strand mat, continuous-strand mat, textile yarn, or fabric roving. Suitable reinforcement materials include any reinforcement material containing a reactive group capable of undergoing a thermoreversible Diels-Alder reaction.

Furan functionalization of the polymer matrix may be carried out using a process as set forth below in Scheme 1.

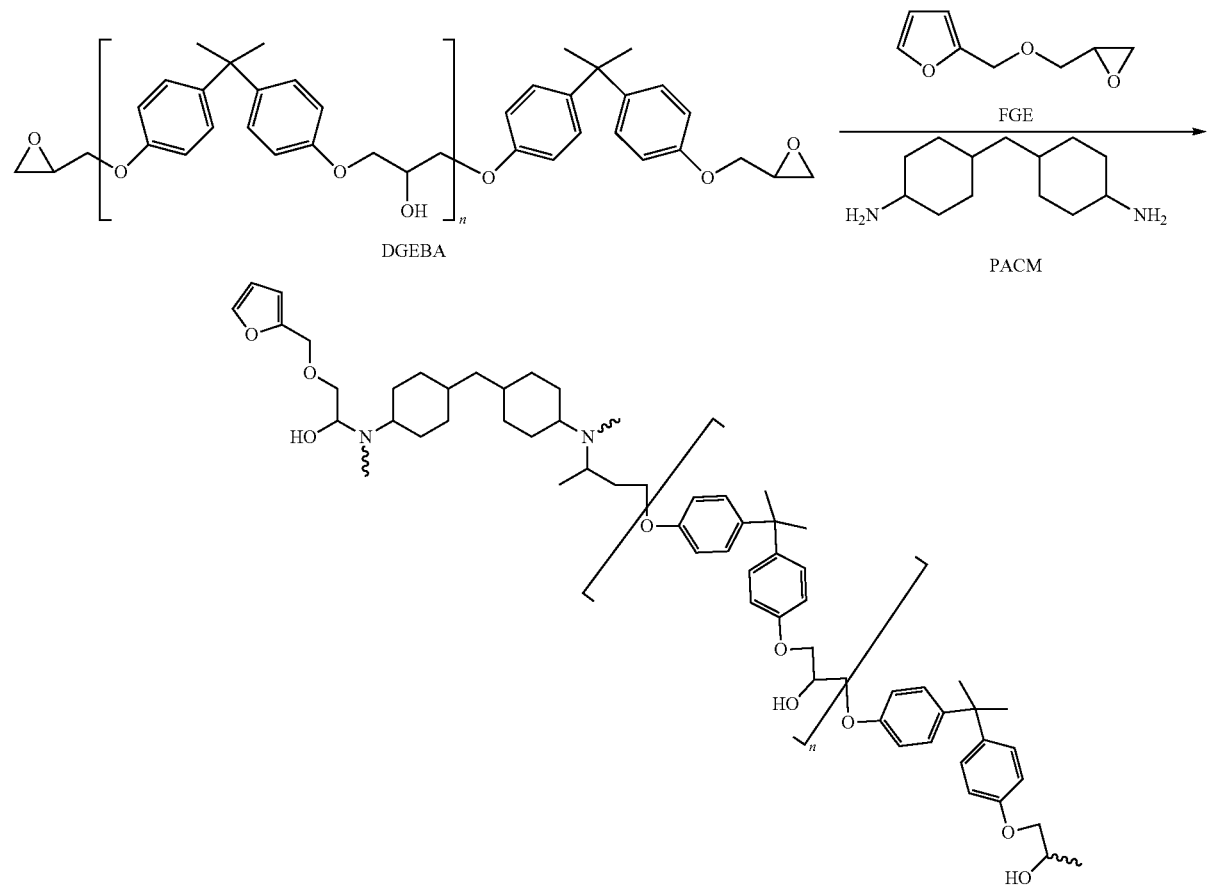

Scheme 1

The polymer matrix precursor is cured in the presence of a suitable curing agent and a furan to functionalize the polymer matrix with a furan. Conventional curing agents may be employed for this process. One suitable curing agent for amino group-containing polymer matrix precursors is 4,4'-methylene biscyclohexanamine (PACM).

Suitable furans include, but are not limited to, furfuryl glycidyl ether (FGE), furfural, 5-methyl-2-furfural, furfuryl alcohol, 5-hydroxymethylfurfural, vinyl 2-furoate, 5-methyl-2-vinylfuroate, 5-tertbutyl-2-vinyl furoate, furfuryl methacrylate, 2-furfuryl methylmethacrylate, 2-vinyl furan, 2-vinyl-5-methyl furan, 2-(2-propylene)furan, 5-methyl-2-methyl vinylidenefuran, furfurylidene acetone, 2-furfurylidene methyl ketone, 5-methyl-2-furfurylidene acetone, 2-furyl oxirane, 5-methyl-2-furyloxirane, furfuryl vinyl ether, 5-methyl-furfuryl vinyl ether, vinyl 2-furyl ketone, bis-2,5-carboxyaldehyde furan, bis-2,5-hydroxymethyl furan, 5-hydroxymethyl-2-ethyl furanacrylate, 2,5-furandicarboxylic acid, 2,5-furan diacid dichloride, 2,5-furan dicarboxylic acid dimethyl ester, furfuryl amine, 5-carboxy-2-furan amine, 5-methylester-2-furan amine, bis-(2,5-methylene isocyanate)furan, bis(2,5-isocyante)furan, furfuryl isocyanate, 2,5-furancarboxydialdehyde, 2-isopropyl-5-methylfuran-, furfuryl vinyl ester, 2-methylene isocyanate furyl, and 2-furfurylidene butyraldehyde.

The degree of furan functionalization of the polymer matrix material can be controlled by substituting a material which does not contain a furan, such as phenyl glycidyl ether (PGE) for a portion of the furan-containing reactant during the functionalization reaction. A suitable amount of furan functionalization is about 0.4 furans/nm$^2$ or more, although healing efficiency does not appear to improve when the amount of furan functionalization exceeds about 0.4 furans/nm$^2$. The amount of furan functionalization may be lower, though this will likely result in a lower healing efficiency. The amount of maleimide functionalization is preferably sufficient for the provision of at least a stoichiometric amount of maleimide functionality, based on the amount of furan present.

Maleimide functionalization of the reinforcing material may be carried out using a two-step process as shown below in Scheme 2.

of suitable polyfunctional maleimides useful in the present invention include, but are not limited to, 1,1'-(methylene di-4,1-phenylene)bismaleimide, 1,3- or 1,4-dimaleimido benzene, 1,3- or 1,4-bis(maleimidomethylene) benzene, 1,3- or 1,4-dimaleimido cyclohexane, 1,3- or 1,4-bis(maleimidomethylene)cyclohexane 4,4'-dimaleimidobiphenyl, bis (4-maleimidophenyl)methane, bis(4-maleimidophenyl) ether, bis(4-maleimidophenyl)sulfone, bis(4-maleimido-3-methylphenyl) methane, bis(4-maleimido-3-chlorophenyl) methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidophenyl)phenylmethane, 3,4-dimaleimidophenyl-4'-maleimidophenylmethane, 1,1-bis(4-maleimidophenyl)-1-phenylmethane, Miki Sangyo's BMI-2300, and maleimides derived from melamine and an addition product of formalin and an aniline in which benzene rings of two or more aniline groups bond through a methylene group.

The method of making a reinforced composite material may include combining a functionalized matrix precursor and a functionalized reinforcing material, and solidifying the matrix precursor to form a solid polymer matrix. The functionalized reinforcing material may be a functionalized reinforcing material provided with a reactive group such as a maleimide, cyclopentadiene, furan, fulvene, isocyanate or secondary amine. The matrix precursor and/or the function-

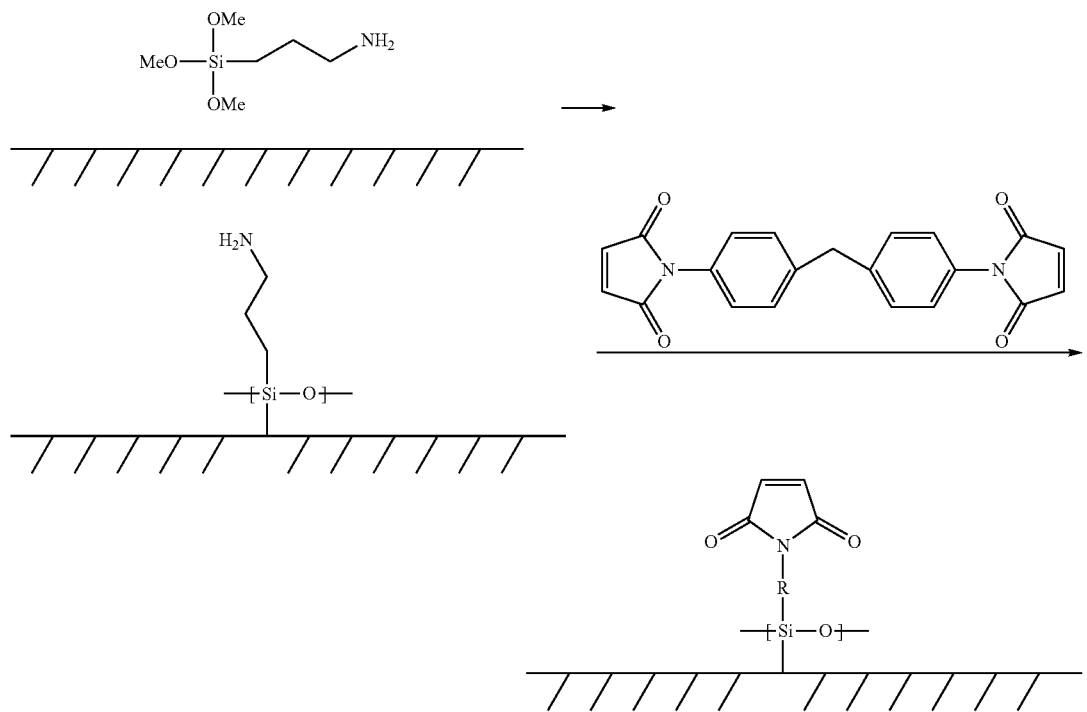

Scheme 2

In the first step of the process, the reinforcing material is silanated using any conventional silanation method. In the second step of the process, the silanated reinforcing material is functionalized with a maleimide through Michael addition of the amine and maleimide.

The maleimides represented by the above formula can be produced by a method known per se which involves reacting maleic anhydride with polyamine to form a maleamide acid, and then dehydro-cyclizing the maleamide acid. Examples alized reinforcing material may further include other substances, such as stabilizers, antioxidants, flame retardants, plasticizers, colorants and dyes, fragrances, or adhesion promoters.

The matrix precursor of these methods may include maleimide, cyclopentadiene, furan, fulvene, isocyanate or secondary amine or other suitable functionalities and may be any substance that can form a solid polymer matrix when solidified. In one example, the matrix precursor includes a monomer and/or prepolymer that can polymerize to form a polymer. The other ingredients may be mixed with the monomer or prepolymer. The matrix precursor may then be solidified by polymerizing the monomer and/or prepolymer of the matrix precursor to form the solid polymer matrix.

In another example, the matrix precursor includes a functionalized polymer in a matrix solvent. The polymer may be dissolved or dispersed in the matrix solvent to form the matrix precursor, and the other ingredients then mixed into the matrix precursor. The matrix precursor may be solidified by removing at least a portion of the matrix solvent from the composition to form the solid polymer matrix.

In another example, the matrix precursor includes a functionalized polymer that is at a temperature above its melting temperature. The polymer may be melted to form the matrix precursor and then mixed with the other ingredients. The matrix precursor may be solidified by cooling the composition to a temperature below the melt temperature of the polymer to form the solid polymer matrix.

Remendability of the interface was demonstrated with single fiber microdroplet pull-out testing. Healing efficiency was found to be independent of displacement before healing and network furan concentration in the range investigated. An overall average of 47% healing efficiency was recorded. Healing was demonstrated for multiple cycles.

Given these results, it is anticipated that glass-reinforced composite with maleimide-functionalized glass and a furan-functionalized network will demonstrate reversible covalent bonding at the network-reinforcement interface. It is also anticipated that other composites containing reinforcing materials and polymer matrix materials provided with functionalities capable of undergoing a thermoreversible Diels-Alder reaction will also demonstrate reversible covalent bonding at the network-reinforcement interface.

The invention is further illustrated by the following examples.

EXAMPLES

Materials

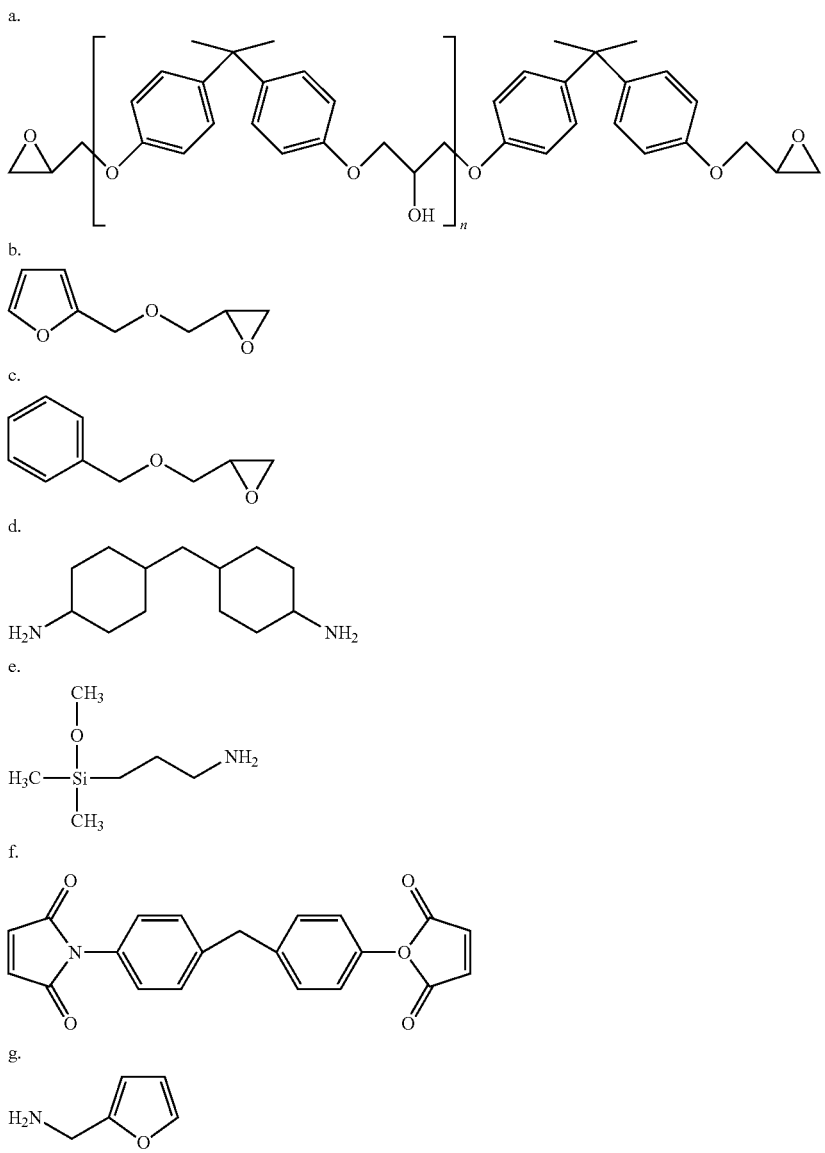

Chemical structures of the monomers used for the preparation of healable networks are shown above: (a) diglycidyl ether of bisphenol-A (DGEBA), n=0.13, (b) furfuryl glycidyl ether (FGE), (c) phenyl glycidyl ether (PGE) and (d) 4,4'-methylene biscyclohexanamine (PACM). Chemical structures of glass functionalizing agents (e) 3-aminopropyl trimethoxysilane (APS) and (f) 1,1'-(methylene di-4,1-phenylene)bismaleimide (BMI) are also shown. An alternative healable network was also prepared with (g) furfuryl amine (FA), DGEBA, and PACM.

Monomers DGEBA (EEW=185-192, EPON 828, Miller-Stephenson), FGE (Sigma-Aldrich), PGE (Sigma-Aldrich), FA (Sigma-Aldrich), and PACM (Air Products) were used as received. A solution of APS (Gelest) in water and ethanol (>99.5%, Sigma-Aldrich) was used for amine functionalization of glass. Maleimide functionalization was performed with a solution of BMI (Sigma-Aldrich) in N,N'-dimethylformamide (DMF, Sigma-Aldrich). Water sized glass fibers were obtained from Fiber Glass Industries. Borosilicate glass slides were obtained from Fisher Scientific.

Polymer Synthesis

The base polymer network consisted of a 6:4 weight ratio of DGEBA to FGE with a stoichiometric amount of the amine curing agent PACM. The reaction was carried out for 2 hours at 60° C., followed by 2 hours at 90° C. Polymer networks were prepared with the same cross-link density as the 6:4 DGEBA-FGE system but with varying amounts of furans. This was achieved by substituting PGE for FGE during the reaction. Stoichiometric calculations were carried out using EEW=188 for DGEBA, 154 for FGE, and 164 for PGE, and an AHEW=52.5 for PACM. For example, a sample with the same crosslink density as the 6:4 DGEBA-FGE system but with half of the number of furan groups would be prepared by mixing 6.00 g of DGEBA, 4.00*½=2.00 g of FGE, 4.00*½*164/154=2.13 g of PGE, and (6.00/188+2/154+2.13/164)*52.5=3.04 g of PACM.

Control studies were performed with a network in which there were no furans (no FGE). To prepare 13.43 g of this polymer, 6.00 g of DGEBA, 4.26 g of PGE, and 3.04 g of PACM were mixed. All polymer networks were cured at 60° C. for two hours and post-cured at 90° C. for two hours.

Alternate furan-functionalized networks were prepared using FA instead of FGE. Just as with the FGE network, furan concentration and $T_g$ can be controlled by adjusting the relative amount of FA. However, in this case, the ratio of FA:PACM is controlled with a stoichiometric amount of DGEBA. An example system consists of 3.76 g of DGEBA, 3.76/376*0.4*97.12=0.39 g of FA, and 3.76/376*(1-0.4)*52.5*2=0.63 g of PACM. This system was shown to heal matrix cracks with the use of a multi-maleimide solution as healing agent.

Glass Functionalization

Both glass fibers and slides were used since each allows for different characterization methods. Although fibers were water sized, in order to remove any impurities from processing or shipping, fibers were cleaned in water, ethanol, and acetone prior to use. Slides were cleaned by running them through a propane flame and then cleaning with acetone to remove any particulates.

A 1 wt. % solution of APS in a 25:75 by weight ratio of ethanol and water was used to provide amine groups on the glass surface. Next, Michael Addition of maleimides and amines provided maleimide functionality through the reaction of BMI (5 wt. % in DMF) with amines for 2 hours at 80° C. Given the short and rigid structure of BMI, Michael Addition of both maleimides on a molecule of BMI is highly unlikely.

For fiber functionalization, fibers were dipped in the reaction solution and reacted under the proscribed conditions. The reaction solution was spin coated onto glass slides. Silanation was carried out at 93° C. for 1 hour. After reaction, the fibers and slides were cleaned with water, ethanol, and acetone.

Differential Scanning Calorimetry

Differential scanning calorimetry was performed with a TA Instruments DSC Q2000. A ramp rate of 10° C. min$^{-1}$ was used for scans.

Attenuated Total Reflectance Fourier Transform Infrared (ATR-FTIR) Spectroscopy

Attenuated total reflectance Fourier transform infrared (ATR-FTIR) spectroscopy was also used to characterize the functionality of glass surfaces. A Thermo-Nicolet Nexus 870 FT-IR with a single bounce Silver Gate ATR with ZnSe crystal from Specac was used for surface characterization.

Contact Angle

Static contact angles were measured using a KSV Instruments CAM 200 as a characterization method for glass slides. Glass fibers were characterized with a Thermo Scientific Cahn DCA dynamic contact angle system. Surface energies were calculated with contact angle values for water, diiodomethane, glycerol, and formamide as the liquid phase.

Example 1

Single Fiber Microdroplet Pull-out Test

Figure 3:
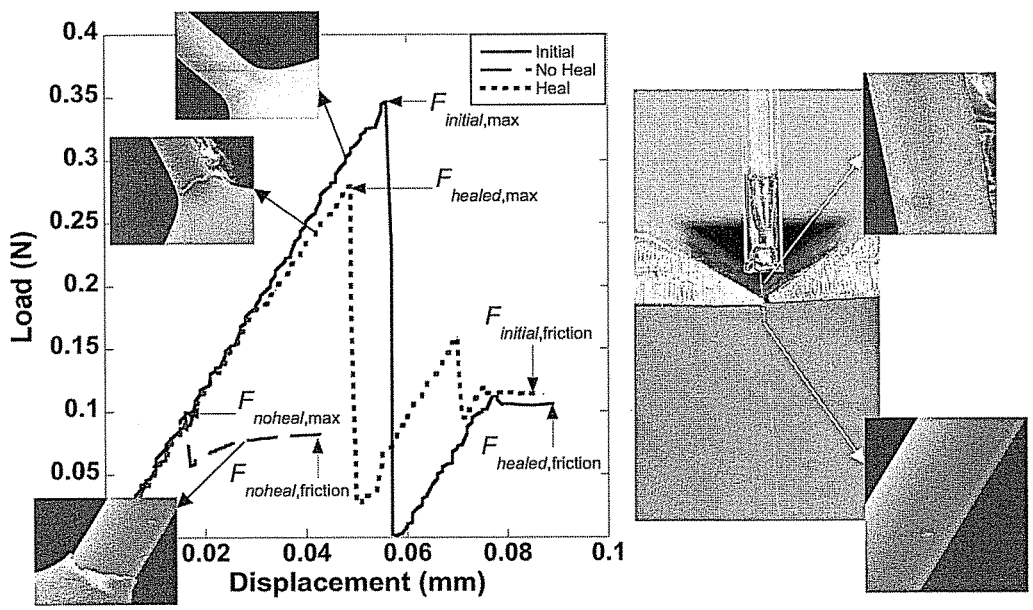
FIG. 3 shows load-displacement curves for an initial specimen (Initial) and for the same specimen before healing but after failure (No Heal) and after healing (Heal) for Example 1. Images are scanning electron micrographs of initial droplet before failure (top) droplet after interfacial debonding (bottom), and droplet with healed interface (middle). On the right is an image of the microdroplet testing apparatus with SEM images focusing on a fiber that a microdroplet has been pulled across (top) and that a microdroplet has not yet been pulled across (bottom).

The healing ability of the fiber-resin interface was investigated with single fiber microdroplet pull-out testing. As shown in FIG. 3, a droplet of resin is cured on a single glass fiber. The droplet is then loaded underneath two razor blades. The fiber is held static while the blades are pulled down at a rate of 0.01 mm min$^{-1}$ until the droplet is delaminated from the fiber ($F_{initial,max}$) and the droplet slides along the fiber ($F_{initial,friction}$). Following failure, the system was healed for 1 hour at 90° C. and 12 hours at 22° C. and then tested to failure again (Heal curve). The No Heal curve shows the behavior of a specimen following failure that is left at room temperature (22° C.). Healing efficiency is defined by the following equation:

$$\eta = \frac{(F_{healed,max} - F_{healed,friction}) - (F_{noheal,max} - F_{noheal,friction})}{(F_{initial,max} - F_{initial,friction}) - (F_{noheal,max} - F_{noheal,friction})} \quad (1)$$

As shown in FIG. 3, $F_{initial,max}$, $F_{healed,max}$, and $F_{noheal,max}$ correspond to the peak loads observed, while $F_{initial,friction}$, $F_{healed,friction}$, and $F_{noheal,friction}$ correspond to the plateau load values for virgin, healed, and unhealed specimens, respectively.

Interfacial shear strength (IFSS) values were also calculated for each fiber-resin combination tested. Equation 2 describes IFSS were $\tau_s$ is IFSS, $d_{fiber}$ is the fiber diameter, and l is the embedded length of resin. Since the droplet is a sphere, l is the same as the droplet diameter ($d_{droplet}$).

$$\tau_s = \frac{F_{initial,max}}{\pi d_{fiber} l} \quad (3)$$

Thermomechanical Polymer Characterization

Figure 4:
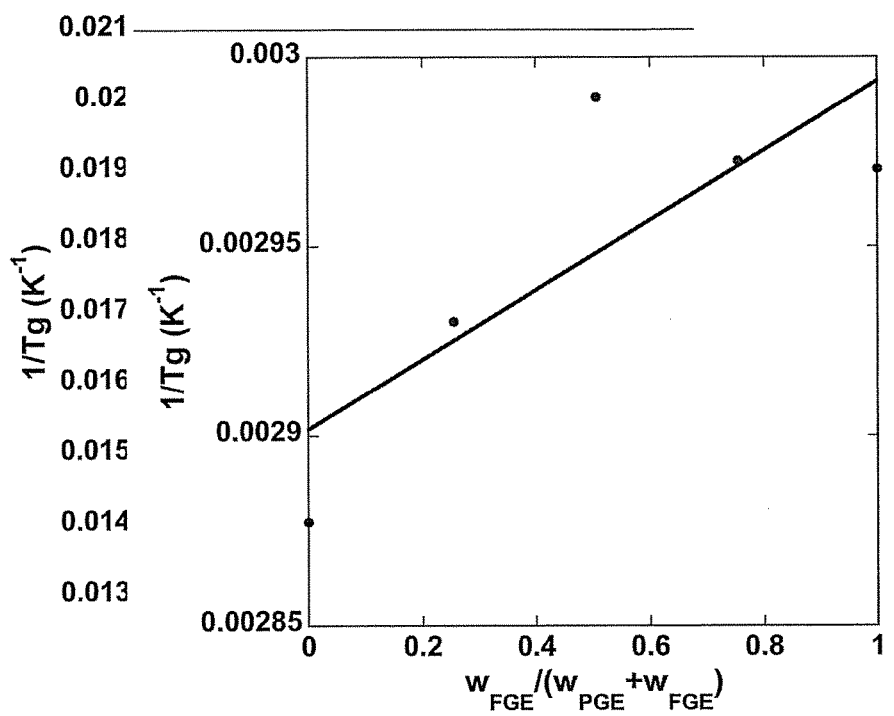
FIG. 4 shows the effect of FGE loading on $T_g$ for Example 1. All networks have the same cross-link density as a 6:4 by weight mixture of DGEBA and FGE with a stoichiometric amount of PACM. The furan content of the network was varied by replacing FGE with PGE.

In order to define the polymer networks, $w_{monomer}$ represents the weight fraction of the epoxy monomer in the mixture of mono-functional monomers bearing the epoxy group (i.e. not including the amine curing agent or difunctional epoxy monomers). $T_g$'s were determined for various polymer formulations via differential scanning calorimetry and corroborated using dynamic mechanical analysis. FIG. 4 shows the relationship between $T_g$ and loading of FGE. The Fox Equation (Equation 4), which describes the $T_g$ of a multicomponent polymer as a function of relative amounts, was used to fit the experimental $T_g$ data:

$$\frac{1}{T_g} = \frac{w_a}{T_{g,a}} + \frac{w_b}{T_{g,b}} \quad (4)$$

In the case of the DGEBA-FGE-PACM system, $w_a$ is the weight fraction of FGE and $w_b$ is the weight fraction of PGE as compared to the total weight of monofunctional epoxide-bearing monomers (FGE and PGE). $T_{g,a}$ corresponds to the $T_g$ of a system containing a 6:4 weight ratio of DGEBA and FGE with a stoichiometric amount of PACM, while $T_{g,b}$ corresponds to the $T_g$ of a system with the same cross-link density as the 6:4 DGEBA:FGE system, but containing PGE instead of FGE. FIG. 4 shows the $T_g$ results fit to Equation 4. The Fox Equation assumes uniform morphology; therefore, the good agreement ($R^2=0.984$) with the DGEBA-FGE-PGE-PACM systems implies that the networks are relatively homogeneous. Indeed, no visible signs of phase separation were apparent, as all of the samples studied were optically transparent.

Glass Characterization

Figure 5:
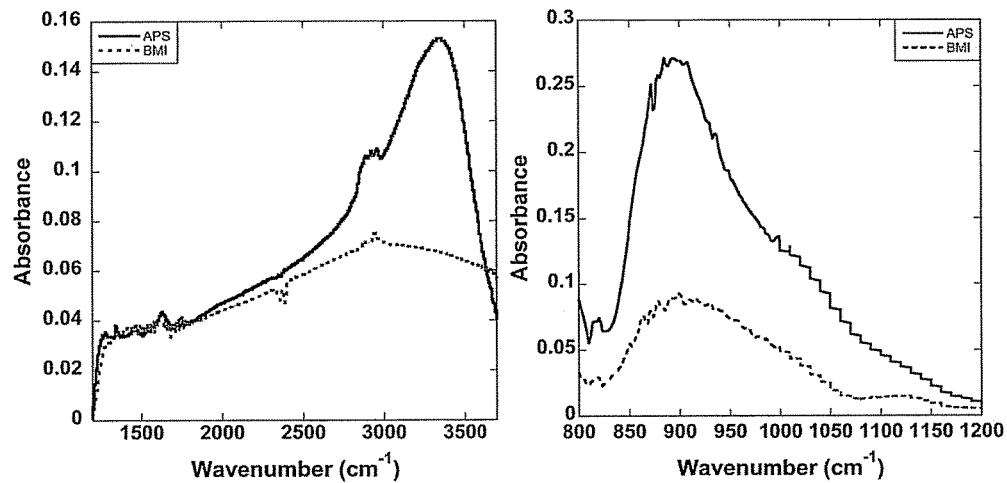
FIG. 5 shows ATR-FTIR spectra of amine-functionalized (APS) and maleimide-functionalized (BMI) glass slides for Example 1.

FIG. 5 shows typical spectra for an amine functionalized glass surface (APS) and a maleimide-functionalized surface (BMI). The APS spectrum represents the state of glass after step 1 of Scheme 2, shown above, and the BMI spectrum shows glass after step 2 of Scheme 2. The characteristic amine peak is visible near 3469 cm$^{-1}$ in the APS spectrum but not in the BMI spectrum, indicating that amine functionalization occurs and amines are consumed completely in the Michael Addition of amines and maleimides. Additionally, the maleimide spectrum contains a broad peak that is consistent with maleimide =C—H stretching at 3100 cm$^{-1}$ and a peak at 1140 cm$^{-1}$ corresponds to the maleimide C—N—C stretch.

Contact angles were measured and surface energies were calculated for slides and fibers to demonstrate that similar properties can be accomplished on the surfaces of glass slides as well as fibers. Surface energy values are reported in Table 2. Surface energies of slides and fibers that underwent the same functionalization are very similar, although amine- and maleimide-functionalized glasses have similar surface energies. Additionally, there is a noticeable difference between plain glass and functionalized glass.

TABLE 2

Surface energies for cleaned, amine-functionalized (APS) and maleimide-functionalized (BMI) glass slides and fibers

| Name | Y (mN · m$^{-1}$) |
|---|---|
| Cleaned Slide | 54.17 |
| Cleaned Fiber | 46.54 |
| APS Slide | 33.16 |
| APS Fiber | 29.15 |
| BMI Slide | 32.65 |
| BMI Fiber | 36.75 |

Figure 6:
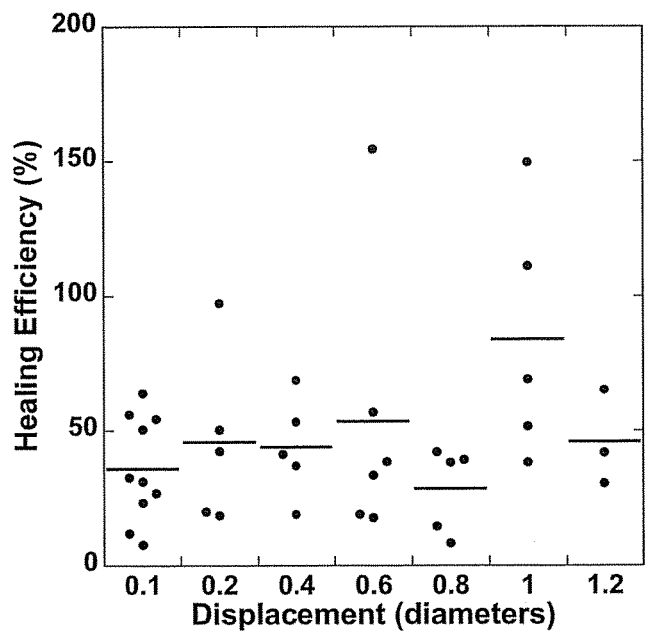
FIG. 6 shows healing as a function of droplet displacement before healing normalized by diameter for Example 1. Specimens were brought to failure and healed for 1 hour at 90° C. and 12 hours at 22° C. Specimens consisted of BMI-functionalized fibers with droplets of the DGEBA-FGE-PACM network. Each point represents a data point. Lines indicate averages for each condition.

Interface Healing Between Furan Functionalized Polymers and Maleimide Functionalized Reinforcing Materials The ability to heal the glass-polymer interface was evaluated with single fiber microdroplet pull-out testing. FIG. 6 shows healing efficiency as a function of droplet displacement before healing, where displacement has been normalized by the droplet diameter.

To explore the effect of displacement on healing more closely, microdroplets were displaced a given amount between 0.01 and 1.2 diameter prior to healing. These results are presented in FIG. 6. It appears that there is no significant dependence of healing efficiency on displacement. The square of the Pearson product moment correlation coefficient, $r^2$, is 0.0198, which shows a very low significance in the relationship between displacement and healing efficiency. The average healing efficiency of all points is 46.84±33.35%. The high standard deviation in this data results from the high data scatter. Scatter is understandable, given that strength values are the result of the statistical probability of a given number of bonds cleaving under a specific force. Two points were identified as outliers. Removing these values gives an average healing efficiency of 41.15±22.91% with $r^2=0.0064$.

Scanning electron microscopy was used to determine the behavior of this system during failure and healing. It is clear that friction of the droplet moving along the fiber causes pieces of the droplet at the droplet-fiber interface to physically degrade. These pieces are left along the surface of the fiber and result in some gaps between the droplet and fiber, which can lower the healing efficiency.

It is interesting to note that in many cases, there are two categories of healing efficiency values: one that is bunched around 15-20% and one that is much higher. Without being bound by theory, the lower set of droplets may represent cases where healing is incomplete. One possible explanation is that the edges of the microdroplet were significantly damaged during interfacial failure, thereby decreasing the embedded length available for healing and also leaving debris along the fiber that could further limit healing of the interface.

Control Experiments

Figure 7:
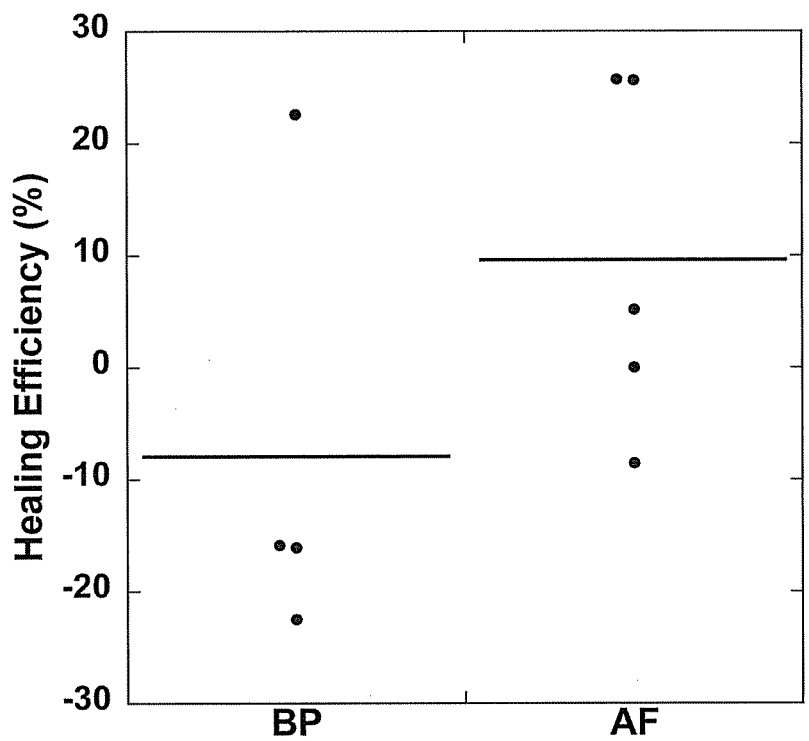
FIG. 7 shows recovery of interfacial properties for non-reactive systems brought to failure and healed for 1 hour at 90° C. and 12 hours at 22° C. for Example 1. BP=BMI-functionalized fibers, droplets of DGEBA-PGE-PACM; AF=APS-functionalized fibers, droplets of DGEBA-FGE-PACM; Each point represents a data point. Lines indicate averages for each condition.
Figure 8:
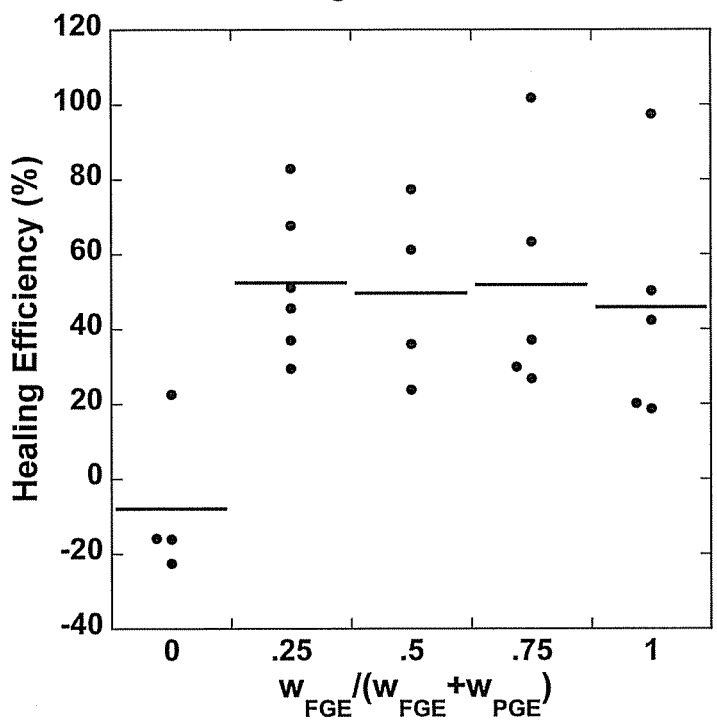
FIG. 8 shows the effect of $w_{FGE}$ on healing efficiency for Example 1. Specimens were brought to failure and healed for 1 hour at 90° C. and 12 hours at 22° C. Specimens consisted of BMI-functionalized fibers with droplets containing varying amounts of FGE with the remainder made up of PGE. Each point represents a data point. Lines indicate averages for each condition.

Systems containing just one of the Diels-Alder functional groups were selected as controls to evaluate healing. The two controls are amine-functionalized fibers with droplets of the furan-functionalized network (AF) and maleimide-functionalized fibers with droplets of the furan-free network (BP). Results are given in FIG. 7. All droplets were displaced 0.2 diameters before healing. The AF and BP systems demonstrated healing efficiency values of 9.59±15.47% and −7.96±20.60%. In both cases the control systems demonstrated lower healing efficiency than the base healing system. One possible explanation for healing in the control systems is the reaction of fiber surface amines with free epoxy groups in the polymer network for AF or reaction of fiber surface amines with free amine groups in the polymer network for BP. However, networks under the cure conditions used are >99% reacted, so this explanation is not necessarily valid. In both systems, increasing the temperature above the $T_g$ can result in mechanical interlocking of roughness and voids on the fiber with the polymer network.
Effect of the Degree of Furan Functionalization of the Polymer Matrix To explore the role that furan concentration plays in interfacial bonding, polymer networks of identical cross-link density but varying furan content were developed and evaluated with single fiber microdroplet pull-out testing. All fibers tested were maleimide functionalized. Healing results are shown in FIG. 8. As long as there is furan in the network, furan content does not play a role in healing efficiency for the amounts investigated, indicating that the interfacial concentration of furan is much greater than the interfacial concentration of maleimide. Since FGE is an order of magnitude more expensive than PGE, it is promising for practical application of this system that an equally effective polymer network can be used for a fraction of the cost.

Based on chemical structures, ~0.4 furans are present per $nm^2$ of the polymer surface for the lowest FGE concentration system investigated. Since healing efficiency does not change with increasing FGE concentration, 0.4 furans/$nm^2$ represents an upper limit for furan content necessary for appreciable healing in this example.

Multiple Heals

Figure 9:
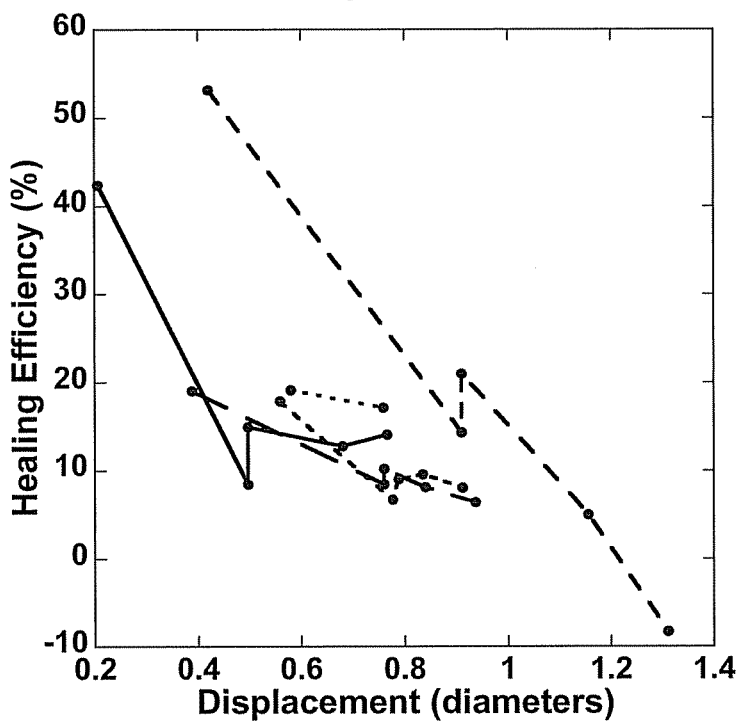
FIG. 9 shows healing over multiple cycles as a function of droplet displacement before healing normalized by diameter for Example 1. Specimens were brought to failure and healed for 1 hour at 90° C. and 12 hours at 22° C. Specimens consisted of BMI-functionalized fibers with droplets of DGEBA-FGE-PACM. Each line represents an individual specimen, with each point giving the healing efficiency of a healing cycle.

The ability of the interface to heal multiple times was demonstrated since it is desirable for a healing system to be effective more than once. Results for single fiber microdroplet pull-out tests are given in FIG. 9. Each curve represents a single specimen, with each point representing a healing cycle. With each cycle, specimens are displaced more, so the first heal is the leftmost point of each curve, with next leftmost point giving the healing efficiency of the second heal, and so on. Healing efficiency tends to decrease with each healing cycle, with a plateau around the third healing cycle at a healing efficiency of ~10%. However, healing was carried out for five cycles successfully in three of the five cases. The decrease in healing efficiency as a result of multiple cycles most likely results from interfacial damage of multiple delaminations.

Interfacial Shear Strength (IFSS)-Effect of Diameter

IFSS values were calculated for each fiber-resin combination studied. The results are presented in Table 3. All values are in the same range; therefore, these results show that functionalization of the fibers as well as the network does not adversely affect IFSS.

TABLE 3

Interfacial shear strength (IFSS) values for various microdroplet-fiber conditions

| Name | IFSS (GPa) | stdev (GPa) |
|---|---|---|
| BP | 30.58 | 7.16 |
| 1030BFP | 24.61 | 10.54 |
| 2020BFP | 27.39 | 2.25 |
| 3010BFP | 31.30 | 11.43 |
| BF | 25.87 | 10.54 |
| AF | 26.35 | 10.29 |

Wherein:
BP = BMI-functionalized fibers, droplets with DGEBA-PGE-PACM,
1030BFP = BMI-functionalized fibers, droplets with $w_{FGE}/(w_{FGE} + w_{PGE}) = 0.25$,
2020BFP = BMI-functionalized fibers, droplets with $w_{FGE}/(w_{FGE} + w_{PGE}) = 0.5$,
3010BFP = BMI-functionalized fibers, droplets with $w_{FGE}/(w_{FGE} + w_{PGE}) = 0.75$,
BF = BMI-functionalized fibers, droplets with DGEBA-FGE-PACM, and
AF = APS-functionalized fibers, droplets with DGEBA-FGE-PACM.

The minimum embedded length to ensure that $F_{initial,max}$ max is not dependent upon embedded length can be calculated from Equation 5.

$$\frac{l_c}{d_{fiber}} = k\left(\frac{E_f}{E_m}\right)^{1/2} \quad (5)$$

In this expression, $l_c$ is the critical embedded length, $d_{fiber}$ is the fiber diameter, $E_f$ is the tensile modulus of the fiber, and $E_m$ is the tensile us of the polymer network. A value of 4.7 for k has been experimentally derived for similar fiber-resin systems. Using literature values for $E_f$ and $E_m$, an embedded length of 645 μm was calculated. However, an embedded length of this size results in fiber failure before interfacial debonding. Droplet diameters were limited to 150-250 μm because it was observed that healing efficiency was not dependent on droplet diameter over this range. Although there is a 100 μm range of diameters, healing efficiency is not affected by the difference in diameters because the forces used to calculate a healing efficiency are all dependent upon a single droplet diameter.

Example 2

Interface Healing of Furan Functionalized Polymers Using a Maleimide Solution

In this example, the polymer matrix was functionalized with furan reactive groups as described above but the reinforcing material was not functionalized. Instead, a solution of 1,1'-(methylenedi-4,1-phenylene)bismaleimide (BMI) in N,N'-dimethylformamide (DMF) was prepared for use as the healing agent.

The composite specimen was prepared in accordance with ASTM D 5045-99 except for the introduction of a crack-arresting hole 3.5 mm from the notched end. All mechanical testing was performed on an Instron 8872. The crack-arresting hole allows for improved crack realignment during healing. A pre-crack was formed at the base of the notch by lightly tapping with a sharp razor blade. Once the specimens were fractured, the crack was filled with 10 μl of healing agent using a microsyringe and left to heal at room temperature under minimal pressure for 12 hours. After healing, specimens were loaded to failure to determine load recovery for the first healing cycle. For subsequent healing cycles, specimens were heated at 90° C. for 1 hour without pressure and healed for 12 hours at room temperature under minimal pressure, e.g. about 4.7 kPa by placing a 240 gram plate on top of the specimens. This testing procedure was repeated until the specimens no longer recovered load following healing.

Figure 14:
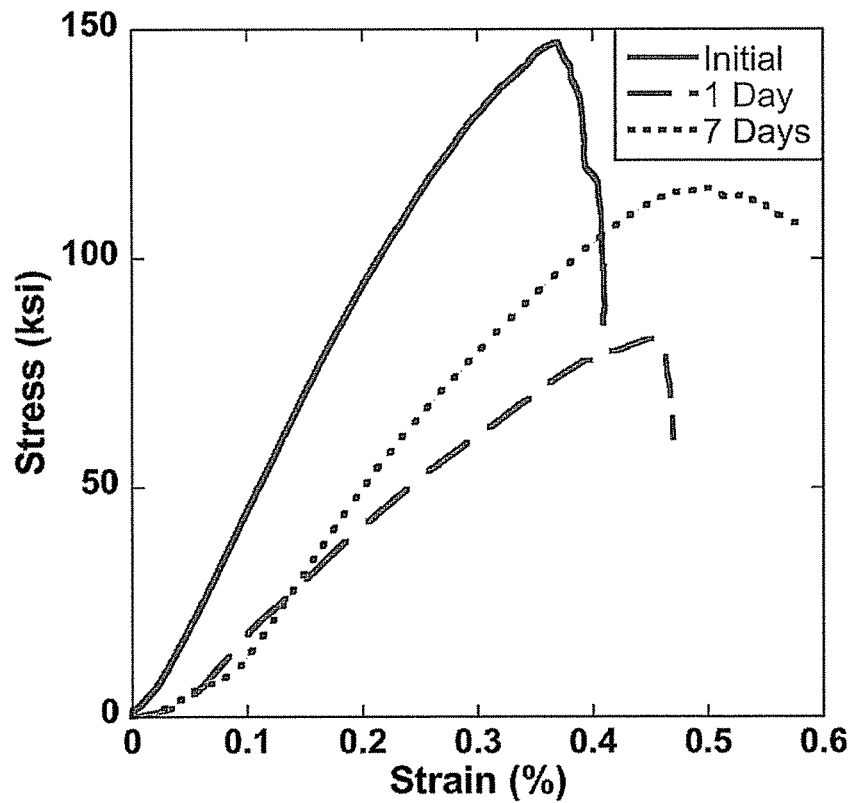
FIG. 14 shows stress-strain curves for healing of a composite specimens following flexural failure as described in Example 2.

To determine flexural strength, glass fiber-reinforced composite rectangular three point bend specimens with dimensions 125 mm×12.5 mm×6.35 mm were tested in accordance with ASTM D 790-03. Specimens were loaded to failure in flexure at a rate of cross-head motion R—2.71 mm $min^{-1}$ with a 16:1 span to thickness ratio. Following failure, holes were drilled into the failure site and 25-75 μl of healing agent was injected into the specimen. Specimens were then healed at room temperature for one day under pressure. Following healing, specimens were again loaded to failure under the same conditions. The results of this test are shown in FIG. 14.

Figure 15:
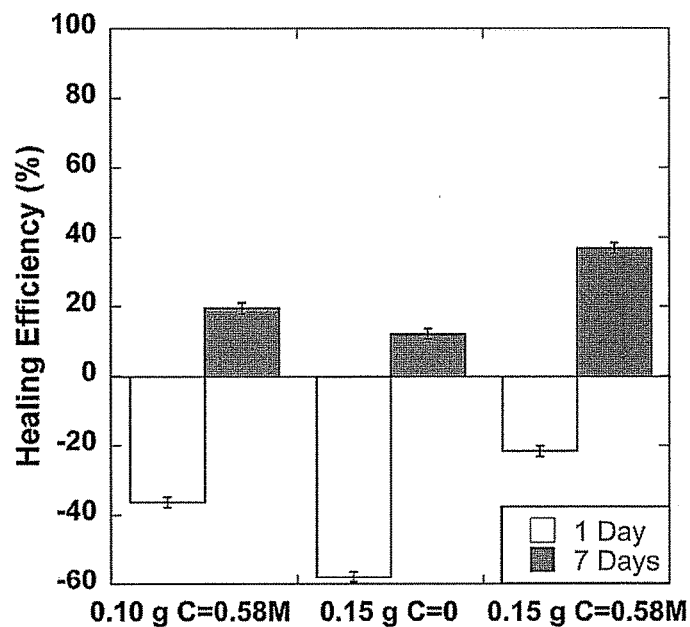
FIG. 15 shows healing efficiencies for short beam shear specimens after being brought to failure and healing for 1 or 7 days as described in Example 2.

Short-beam specimens of glass fiber-reinforced composites were prepared and tested in accordance with ASTM D 2344/D 2344 M-00 with the following dimensions: 50 mm×12.5 mm×6.35 mm Specimens were tested with a span to thickness ratio of 3:1. To deliver healing agent to the failure site, glass capillary tubes were included in the composite pieces. The capillary tubes were attached to pipettes filled with 50 µl of healing agent. Specimens were loaded to failure in flexure at a rate of 12.5 mm min$^{-1}$. Upon failure, healing agent was pushed from the pipette into the capillary tube and delivered to the failure site. Specimens were healed at room temperature for 1 or 7 days under pressure and were then loaded to failure under the same test conditions. The results are shown in FIG. 15.

Figure 16:
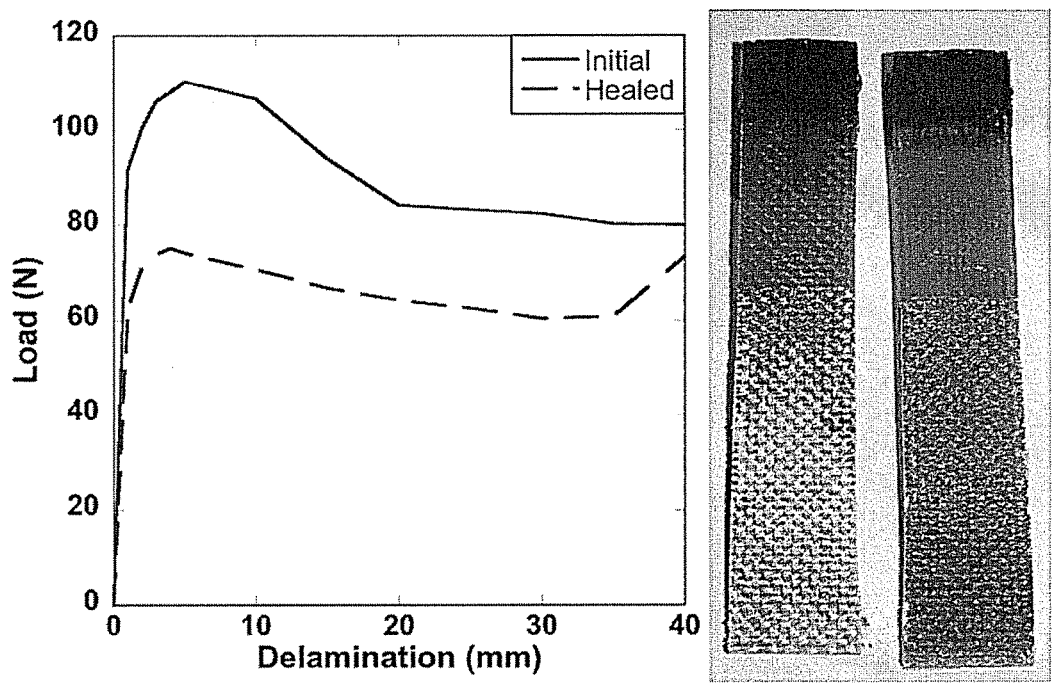
FIG. 16 shows load-delamination behavior for an initial specimen and a healed double cantilever beam specimen as described in Example 2.

Double cantilever beam (DCB) specimens of glass-fiber reinforced composites with dimensions of 125 mm×25 mm×6.35 mm were prepared and tested in accordance with ASTM D5528-01. Specimens were loaded in tension at a rate of 2 mm min$^{-1}$ to form a pre-crack, were unloaded, and then were subsequently reloaded at the same rate to a crack length of 40 mm. While still loaded at a crack length of 40 mm, 0.5 g (53 µl) of healing agent was injected into the interface between specimen sides. Specimens were healed at room temperature for seven days under pressure. Following healing, specimens were loaded to a crack length of 40 mm at a rate of 2 mm min$^{-1}$. This procedure shows that the interlaminar fracture toughness, $G_{1C}$, increases initially, but stabilized with delamination growth. The results are shown in FIG. 16.

Figure 10:
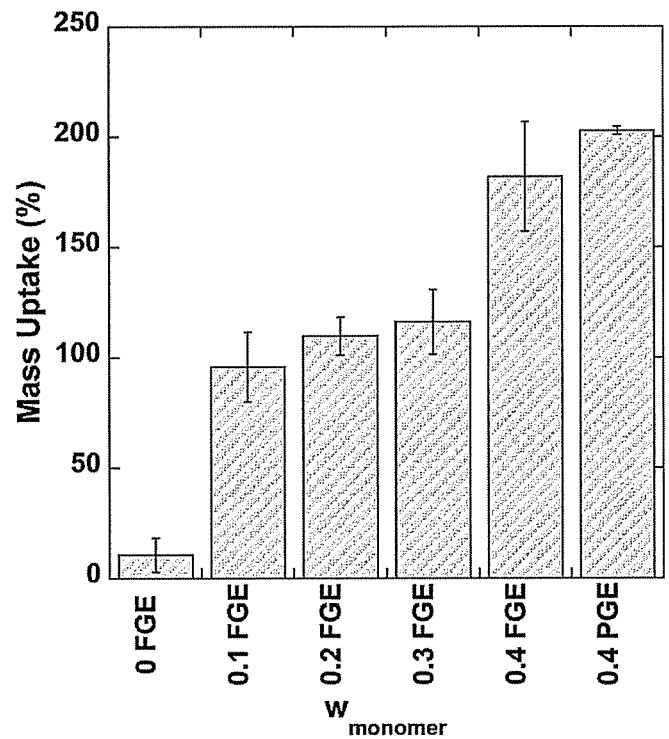
FIG. 10 shows the swelling (mass uptake) of various thermoset systems in DMF for Example 2.
Figure 11:
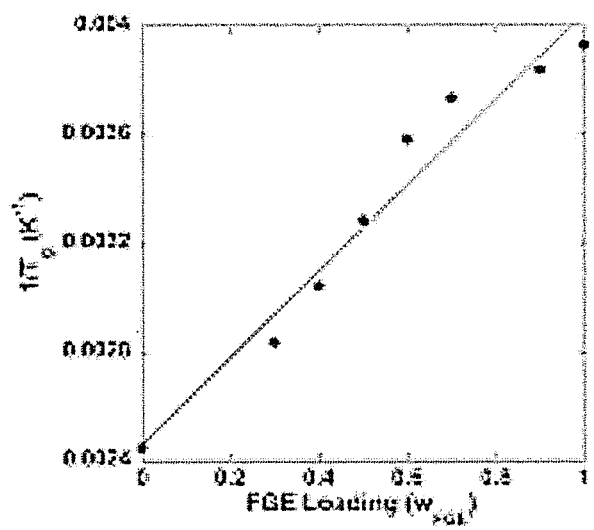
FIG. 11 shows the relationship between $T_g$ and FGE content for the furan-functionalized polymers of Example 2.
Figure 12:
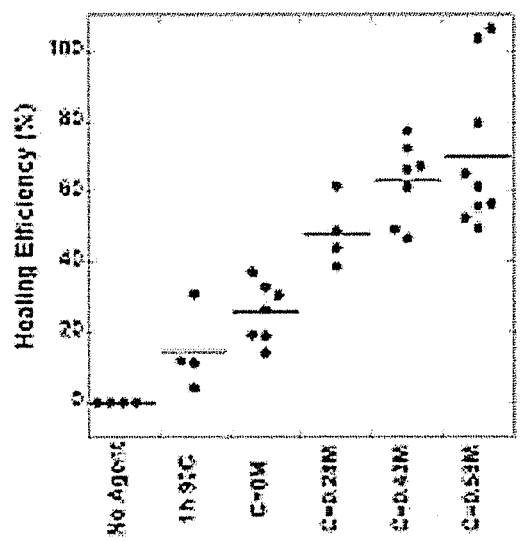
FIG. 12 shows the healing efficiency of furan-functionalized polymer specimens with various healing agents for the first healing cycle of Example 2, wherein the concentration refers to the concentration of BMI employed. Each dot represents a single data point, bars represent average healing efficiency for the data set.

FIG. 10 shows the swelling (mass uptake) of various thermoset systems prepared in accordance with this example in DMF. These values represent equilibrium mass uptake values. FIG. 11 shows the relationship between $T_g$ and loading of FGE of various thermoset systems prepared in accordance with this example. FIG. 12 shows the healing efficiencies for the first healing cycle using different healing agents compared to the load at failure of the initial composite material. An average healing efficiency of 28.4±8.3% was observed when pure DMF (C=0 M) was used as the healing agent and 14.6±11.4% for dry healing above the $T_g$. Healing efficiency increased greatly with increasing BMI concentration up to 0.58 M. The use of a BMI healing agent solution with a maleimide concentration of 0.58 M resulted in an average healing efficiency of 70.0±21.6%, with two data points demonstrating healing greater than 100%.

Figure 13:
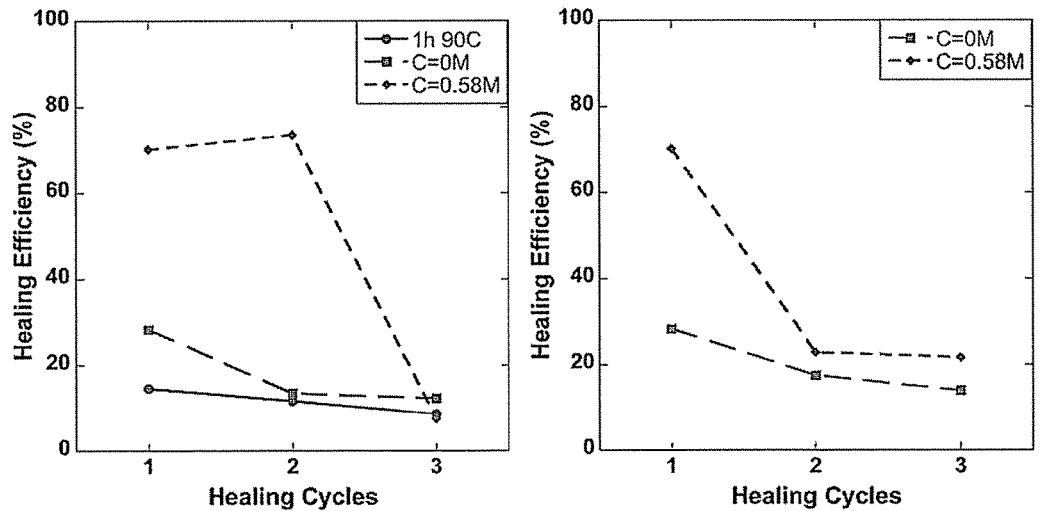
FIG. 13 shows the healing efficiency results for multiple healing cycles of furan-functionalized polymer specimens of Example 2.

The capacity to heal multiple times was investigated for the 0.58 M BMI solution, pure DMF and dry treatment for 1 hour at 90° C. For the second and subsequent healing cycles, the polymer specimens were heated at 90° C. for 1 hour to break apart Diels-Alder adducts and soften the polymer network, followed by healing at room temperature under minimal pressure (about 4.7 kPa) for 12 hours. The results of these experiments are shown in the left hand side of FIG. 13.

Additional healing studies were performed in which the reheal procedure was modified. Instead of heating at 90° C. for 1 hour, 10 µl of DMF was injected into the crack surface of the polymer specimens for each of the second and subsequent healing cycles and specimens were allowed to heal under ambient conditions under minimal pressure (about 4.7 kPa) for 12 hours. The results are shown on the right hand side of FIG. 13.

The foregoing examples have been presented for the purpose of illustration and description only and are not to be construed as limiting the invention in any way. The scope of the invention is to be determined by the claims appended hereto.

The invention claimed is:

1. A composite material comprising:
 a Diels-Alder reaction product of:
 a polymer matrix material including at least a first reactive group that is capable of a thermoreversible Diels-Alder reaction; and
 a reinforcing material including at least a second reactive group that is capable of a thermoreversible Diels-Alder reaction with the first reactive group of the polymer matrix material to produce a remendable composite material, wherein the second reactive group of the reinforcing material comprises a reactive group selected from the group consisting of a furan group, a fulvene group, and a maleimide group, and when said second reactive group comprises a maleimide group, said composite material is made by the steps of:
 (i) silanating the reinforcing material with an amino group-containing silane,
 (ii) functionalizing the silanated reinforcing material by reacting the amino group with a maleimide having two or more maleimide groups, and
 (iii) reacting the reaction product of step (ii) with the polymer matrix material by a Diels-Alder reaction.

2. The composite material as claimed in claim 1 wherein the first reactive group of the polymer matrix material comprises a reactive group selected from the group consisting of a furan group, a fulvene group, and a maleimide group.

3. The composite material as claimed in claim 2, wherein the first reactive group of the polymer matrix material comprises the furan group.

4. The composite material as claimed in claim 1, wherein the second reactive group of the reinforcing material comprises the maleimide group and the first reactive group of the polymer matrix material comprises a furan group.

5. The composite material as claimed in claim 1, wherein the composite material further comprises one or more capsules or particles housing a solution containing additional said second reactive group.

6. A composite material as claimed in claim 1 wherein the second reactive group of the reinforcing material comprises the maleimide group.

7. The composite material as claimed in claim 6, wherein the second reactive group of the reinforcing material comprises the maleimide group and the reinforcing material is functionalized with a bismaleimide.

8. A method for repairing a composite material comprising a Diels-Alder reaction product of:
 a polymer matrix material comprising a first reactive group that is capable of a thermoreversible Diels-Alder reaction, and
 a reinforcing material comprising a second reactive group that is capable of a thermoreversible Diels-Alder reaction with the first reactive group of the polymer matrix material, wherein the second reactive group of the reinforcing material comprises a reactive group selected from the group consisting of a furan group, a fulvene group, and a maleimide group, and when said second reactive group comprises a maleimide group, said composite material is made by the steps of:
 (i) silanating the reinforcing material with an amino group-containing silane,
 (ii) functionalizing the silanated reinforcing material by reacting the amino group with a maleimide having two or more maleimide groups, and
 (iii) reacting the reaction product of step (ii) with the polymer matrix material by a Diels-Alder reaction;
 said method comprising the steps of:
 thermally treating the composite material at a temperature sufficient to thermally reverse a Diels-Alder reaction between the first reactive group and the second reactive group, and cooling said thermally treated composite material to a temperature at which the first reactive group reacts with the second reactive group via a Diels-Alder reaction.

9. The method as claimed in claim 8, wherein the first reactive group of the polymer matrix material comprises a reactive group selected from the group consisting of a furan group, a fulvene group, and a maleimide group.

10. The method as claimed in claim 9, wherein the first reactive group of the polymer matrix material comprises the furan group.

11. The method as claimed in claim 8, wherein the second reactive group of the reinforcing material comprises the maleimide group and the first reactive group of the polymer matrix material comprises a furan group.

12. The method as claimed in claim 8, wherein the composite material further comprises one or more capsules or particles housing a solution containing additional said second reactive group.

13. The method as claimed in claim 8 wherein the second reactive group of the reinforcing material comprises the maleimide group.

14. A method of making a composite material comprising the steps of combining a polymer matrix material functionalized with a first reactive group that is capable of a thermoreversible Diels-Alder reaction, and a reinforcing material that is functionalized with a second reactive group that is capable of a thermoreversible Diels-Alder reaction with said first reactive group, wherein the second reactive group of the reinforcing material comprises a reactive group selected from the group consisting of a furan group, a fulvene group, and a maleimide group; and reacting the first reactive group with a second reactive group via a Diels-Alder reaction to form a composite material,
wherein when said second reactive group comprises a maleimide group, said composite material is made by the steps of:
(i) silanating the reinforcing material with an amino group-containing silane,
(ii) functionalizing the silanated reinforcing material by reacting the amino group with a maleimide having two of more maleimide groups, and
(iii) reacting the reaction product of step (ii) with the polymer matrix material by a Diels-Alder reaction.

15. The composite material as claimed in claim 4, wherein the reinforcing material comprises functionalized glass fibers.

16. The composite material as claimed in claim 1, wherein the polymer matrix material comprises polymer selected from the group consisting of: a polyamide, a polyester, a polycarbonate, a polyether, an epoxy polymer; a vinyl ester polymer; a polyimide, a phenol-formaldehyde polymer, an amine-formaldehyde polymer, a polysulfone; a poly(acrylonitrile-butadiene-styrene), a polyurethane; a polyolefin, a polystyrene, a polyacrylonitrile, a polyvinyl polymer, a polyacrylate, a poly(alkylacrylate), a polysilane and a polyphosphazene.

17. The composite material as claimed in claim 1 wherein the polymer matrix material comprises a furan-functionalized epoxy-amine thermoset.

18. The composite material as claimed in claim 1, wherein the polymer matrix material comprises an elastomer.

19. The method as claimed in claim 11, wherein the reinforcing material comprises functionalized glass fibers.

20. The method as claimed in claim 14, for making a composite material using a maleimide having two or more maleimide groups, said method further comprising the steps of:
silanating the reinforcing material to provide a silanated reinforcing material, and
functionalizing the silanated reinforcing material with a maleimide having two or more maleimide groups via Michael addition to provide the reinforcing material having the second reactive group.

21. The composite material as claimed in claim 1, wherein the second reactive group is the maleimide group and the second reactive group is introduced to the reinforcing material by functionalizing the reinforcing material with a polyfunctional maleimide selected from the group consisting of 1,1'-(methylene di-4,1-phenylene)bismaleimide, 1,3- or 1,4-dimaleimido benzene, 1,3- or 1,4-bis(maleimidomethylene) benzene, 1,3- or 1,4-dimaleimido cyclohexane, 1,3- or 1,4-bis(maleimidomethylene)cyclohexane 4,4'-dimaleimidobiphenyl, bis(4-maleimidophenyl)methane, bis(4-maleimidophenyl)ether, bis(4-maleimidophenyl)sulfone, bis(4-maleimido-3-methylphenyl) methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidophenyl) phenylmethane, 3,4-dimaleimidophenyl-4'-maleimidophenylmethane, 1,1-bis(4-maleimidophenyl)-1-phenylmethane, and maleimides derived from melamine and an addition product of formalin and an aniline in which benzene rings of two or more anilines bond through methylene group.

22. The composite material as claimed in claim 1, wherein the first reactive group is a furan that is introduced to the polymer matrix material by functionalizing the polymer matrix material with a furan selected from the group consisting of furfuryl glycidyl ether, furfural, 5-methyl-2-furfural, furfuryl alcohol, 5-hydroxymethylfurfural, vinyl 2-furoate, 5-methyl-2-vinylfuroate, 5-tertbutyl-2-vinyl furoate, furfuryl methacrylate, 2-furfuryl methylmethacrylate, 2-vinyl furan, 2-vinyl-5-methyl furan, 2-(2-propylene)furan, 5-methyl-2-methyl vinylidenefuran, furfurylidene acetone, 2-furfurylidene methyl ketone, 5-methyl-2-furfurylidene acetone, 2-furyl oxirane, 5-methyl-2-furyloxirane, furfuryl vinyl ether, 5-methyl-furfuryl vinyl ether, vinyl 2-furyl ketone, bis-2,5-carboxyaldehyde furan, bis-2,5-hydroxymethyl furan, 5-hydroxymethyl-2-ethyl furanacrylate, 2,5-furandicarboxylic acid, 2,5-furan diacid dichloride, 2,5-furan dicarboxylic acid dimethyl ester, furfuryl amine, 5-carboxy-2-furan amine, 5-methylester-2-furan amine, bis-(2,5-methylene isocyanate)furan, bis(2,5-isocyante)furan, furfuryl isocyanate, 2,5-furancarboxydialdehyde, 2-isopropyl-5-methylfuran-, furfuryl vinyl ester, 2-methylene isocyanate furyl, and 2-furfurylidene butyraldehyde.

* * * * *